United States Patent
Manens et al.

(10) Patent No.: US 7,276,743 B2
(45) Date of Patent: Oct. 2, 2007

(54) RETAINING RING WITH CONDUCTIVE PORTION

(75) Inventors: Antoine P. Manens, Mountain View, CA (US); Suresh Shrauti, San Mateo, CA (US); Alain Duboust, Sunnyvale, CA (US); Yan Wang, Sunnyvale, CA (US); Liang-Yuh Chen, Foster City, CA (US)

(73) Assignee: Applied Materials, Inc., Santa Clara, CA (US)

( * ) Notice: Subject to any disclaimer, the term of this patent is extended or adjusted under 35 U.S.C. 154(b) by 121 days.

(21) Appl. No.: 11/127,790

(22) Filed: May 11, 2005

(65) Prior Publication Data

US 2005/0282322 A1 Dec. 22, 2005

Related U.S. Application Data

(60) Provisional application No. 60/571,049, filed on May 13, 2004.

(51) Int. Cl.
*H01L 29/74* (2006.01)
*H01L 31/111* (2006.01)

(52) U.S. Cl. .................. 257/127; 257/170; 257/484; 257/E21.23; 257/E21.216

(58) Field of Classification Search ............... 257/127, 257/128, 129, 170, 484, 762, 768; 438/140, 438/682, 687, 688
See application file for complete search history.

(56) References Cited

U.S. PATENT DOCUMENTS 5,738,574 A    4/1998  Tolles et al.
6,375,549 B1   4/2002  Glashauser et al.
6,390,904 B1*  5/2002  Gleason et al. ............. 451/286
6,422,927 B1   7/2002  Zuniga
6,450,868 B1   9/2002  Zuniga et al.
6,811,680 B2   11/2004 Chen et al.
6,848,970 B2*  2/2005  Manens et al. ................ 451/5
6,857,945 B1*  2/2005  Chen et al. .................. 451/288
6,884,153 B2   4/2005  Manens et al.
6,988,942 B2*  1/2006  Chen et al. .................. 451/533
6,991,526 B2*  1/2006  Sun et al. .................... 451/104
6,991,528 B2*  1/2006  Hu et al. ..................... 451/526
2003/0114087 A1  6/2003  Duboust et al.
2003/0220053 A1  11/2003 Manens et al.
2004/0123951 A1  7/2004  Kramer et al.
2004/0182721 A1  9/2004  Manens et al.

OTHER PUBLICATIONS

International Search Report and Written Opinion of the International Search Authority, International Application No. PCT/US2005/016431, Aug. 25, 2005, 7 pp.
U.S. Appl. No. 10/810,784, filed Mar. 26, 2004, Chen et al., 17 pages.

* cited by examiner

Primary Examiner—David Nhu
(74) Attorney, Agent, or Firm—Fish & Richardson

(57) ABSTRACT

A retaining ring for use with electrochemical mechanical processing is described. The retaining ring has a generally annular body formed with a conductive portion and a non-conductive portion. The non-conductive portion contacts the substrate during polishing. The conductive portion is electrically biased during polishing to reduce the edge effect that tends to occur with conventional electrochemical mechanical processing systems.

28 Claims, 11 Drawing Sheets

RETAINING RING WITH CONDUCTIVE PORTION

CROSS-REFERENCE TO RELATED APPLICATIONS

This application claims priority to U.S. Provisional Application No. 60/571,049, filed on May 13, 2004, which is incorporated by reference herein.

BACKGROUND

The present invention relates to methods and apparatus for retaining a substrate during electrochemical mechanical processing.

An integrated circuit is typically formed on a substrate by the sequential deposition of conductive, semiconductive or insulative layers on a silicon wafer. One fabrication step involves depositing a filler layer over a non-planar surface, and planarizing the filler layer until the non-planar surface is exposed. For example, a conductive filler layer, such as copper, can be deposited on a patterned insulative layer to fill the trenches or holes in the insulative layer. The filler layer is then polished until the raised pattern of the insulative layer is exposed. After planarization, the portions of the conductive layer remaining between the raised pattern of the insulative layer form vias, plugs and lines that provide conductive paths between thin film circuits on the substrate. In addition, planarization is needed to planarize the substrate surface for photolithography.

Chemical mechanical polishing (CMP) is one accepted method of planarization. This planarization method typically requires that the substrate be mounted on a carrier or polishing head. The exposed surface of the substrate is placed against a rotating polishing disk pad or belt pad. The polishing pad can be either a "standard" pad or a fixed-abrasive pad. A standard pad has a durable roughened surface, whereas a fixed-abrasive pad has abrasive particles held in a containment medium. The carrier head provides a controllable load on the substrate to push it against the polishing pad. A polishing liquid, including at least one chemically reactive agent, is supplied to the surface of the polishing pad. The polishing liquid can optionally include abrasive particles, e.g., if a standard pad is used.

A variation of CMP, which is particularly useful for copper polishing, is electrochemical mechanical processing (ECMP). The ECMP process is similar to the conventional CMP process, but has been designed for copper film polishing at very low down and shear forces, and is therefore suitable for low-k/Cu technologies. In ECMP techniques, conductive material is removed from the substrate surface by electrochemical dissolution while concurrently polishing the substrate, typically with reduced mechanical abrasion as compared to conventional CMP processes. The electrochemical dissolution is performed by applying a bias between a cathode and the substrate surface and thus removing conductive material from the substrate surface into a surrounding electrolyte.

Ideally, the ECMP process polishes the substrate layer to a desired planarity and thickness. Polishing beyond this point can lead to overpolishing (removing too much) of a conductive layer or film, which can lead to increased circuit resistance. Not polishing the substrate enough, or underpolishing (removing too little) of the conductive layer, can lead to electrical shorting. Variations in the initial thickness of the substrate layer, the polishing solution composition, the polishing pad condition, the relative speed between the polishing pad and the substrate, and the load on the substrate can cause variations in the material removal rate. These variations can occur between substrates or across the radius of a single substrate, such as when a substrate is over polished in one region and underpolished in another region. The CMP apparatus can be selected to control the amount of polishing of a substrate.

SUMMARY

In one aspect, the invention is directed to a retaining ring for a electrochemical mechanical processing system. The retaining ring includes a conductive portion having a lower surface, wherein the lower surface is exposed to the environment, and a substrate contacting portion with an inner diameter surface, the substrate contacting portion formed of a material that is sufficiently compressible to substantially prevent damage caused by contact between the inner diameter surface and a substrate, and wherein the lower surface of the conductive portion of the substrate contacting portion contacts the polishing surface.

In another aspect, the invention is directed to a retaining ring having a conductive portion and a substrate contacting portion. The conductive portion has an upper surface and a lower surface. The substrate contacting portion forms at least part of an inner diameter surface of the retaining ring, the substrate contacting portion is formed of an insulating material and is configured to contact a polishing surface during a polishing process.

In one aspect, the invention is directed to a carrier head for electrochemical mechanical processing. The carrier head includes a base attached to a retaining ring. The retaining ring includes a conductive portion having an upper surface and a lower surface and an insulating portion. The insulating portion has one or more openings extending through the insulating portion and exposing the lower surface of the conductive portion. An upper surface of the insulating portion contacts the lower surface of the conductive portion.

In another aspect, a method of forming a retaining ring for electrochemical mechanical processing is described. The method includes forming a conductive portion of a metal. An annular body is formed of a non-conducting material that is less rigid than the metal, wherein the annular body has a lower surface that is configured to contact a polishing surface, an inner diameter surface that is configured to contact a substrate during polishing and a portion that is configured to contact the conductive portion. The conductive portion is secured to the annular body so that the inner diameter surface of the annular body is exposed.

In one aspect, the invention is directed to a method of operating a system for electrochemical mechanical processing. The method includes electrically biasing a polishing pad assembly and biasing a substrate. A conductive retaining ring is electrically biased at the same voltage as the substrate. A relative motion is created between a substrate and the polishing pad assembly, wherein the substrate is retained by the conductive retaining ring.

Implementations of the invention may include none, one or more of the following features. The conductive portion or body can be annular. The conductive portion can be biased by an element in the polishing pad assembly. The conductive portion can be biased by a voltage source having an electrical contact through the carrier head. The conductive portion can be formed of the same metal as the metal being removed from the substrate by the ECMP process. The conductive portion can be actuated within the retaining ring. The gap between the bottom of the retaining ring and the conductive body can be maintained at a desired height, such as with a spring or spacer. The conductive body can be formed of more than one type of metal. The conductive portion can be annular and formed of copper, gold, platinum, palladium, titanium, silver, rhodium, iridium or an alloy of one or more of these materials. The conductive body can be a core of a first metal plated by a second metal. The conductive body can surround a material that is sufficiently non-rigid such that an inner diameter of the retaining ring is formed of the non-rigid material. A spacer can contact the lower surface of the conductive portion. The spacer can be conductive, non-conductive, and/or a material that is substantially inert to the polishing process. The spacer can be formed of stainless steel. The spacer can be sufficiently thin so that a conductive element associated with the polishing surface contacts the conductive portion of the retaining ring. A spring can place sufficient downward force on the conductive portion to cause a lower surface of the spacer to be maintained substantially planar with the lower surface of the non-conductive portions. Instead of a spring, a pressure regulator can be fluidly connected to a recess above the conductive portion to control the position of the conductive potion in the retaining ring. As an alternative to spacers, the substrate contacting portion can be between the conductive portion and the polishing surface. The substrate contacting portion can allow part of the bottom of the conductive portion to be exposed to the environment.

One potential advantage of the invention is that an electrically conducting retaining ring can be electrically biased. Electrically biasing the retaining ring during ECMP polishing can improve polishing uniformity or the polishing rate across the substrate (i.e., "within-wafer uniformity"), particularly at the substrate edge. Improved polishing uniformity can result in improved process stability and increased yield.

Forming the retaining ring with an inner diameter surface formed of a non-rigid material that is surrounded by a conductive ring can reduce the likelihood of damage to the substrate when the substrate contacts the inner diameter surface of the retaining ring. The width of the conductive ring can be selected such that the conductive portion of the ring is wide enough to contact a conductive portion of the polishing surface. The conductive ring can be formed from multiple conductive elements, such as a first metal that interacts with the ECMP process and a second metal that reacts little to not at all with the process. Forming the ring of two or more types of metals enables the width of the ring to be selected to be sufficient to contact the conductive portion while simultaneously limiting the interaction of the conductive ring with any current-based endpoint detector.

Using the same material that is being polished in the retaining ring can increase the uniformity of the polishing rate across the substrate. Using the same material also ensures chemical compatibility with the substrate, reducing the likelihood of damage to the substrate. On the other hand, using a different material, such as one that does not interact with the ECMP process, can lead to a longer useful life of the conductive portion of the retaining ring.

Forming one or more spacers between the conductive ring and the polishing surface can prevent the conductive ring from directly contacting the polishing surface, thus reducing frictional wear on the conductive ring and improving the lifetime of the conductive ring. The spacers can be sized to allow conductive biasing elements in the polishing pad assembly to contact the conductive ring. The spacers can control the gap between the lower surface of the retaining ring and the lower surface of the conductive ring. The spacers can be made of an inert material so that they will not wear from the polishing process and so that the gap will remain constant throughout the useful life of the retaining ring. The conductive ring can also be spring loaded to ensure that the spacers contact the polishing surface. Alternatively, the conductive ring can be actuated, e.g., moved closer to or further from the polishing surface, to provide more control over the polishing process.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
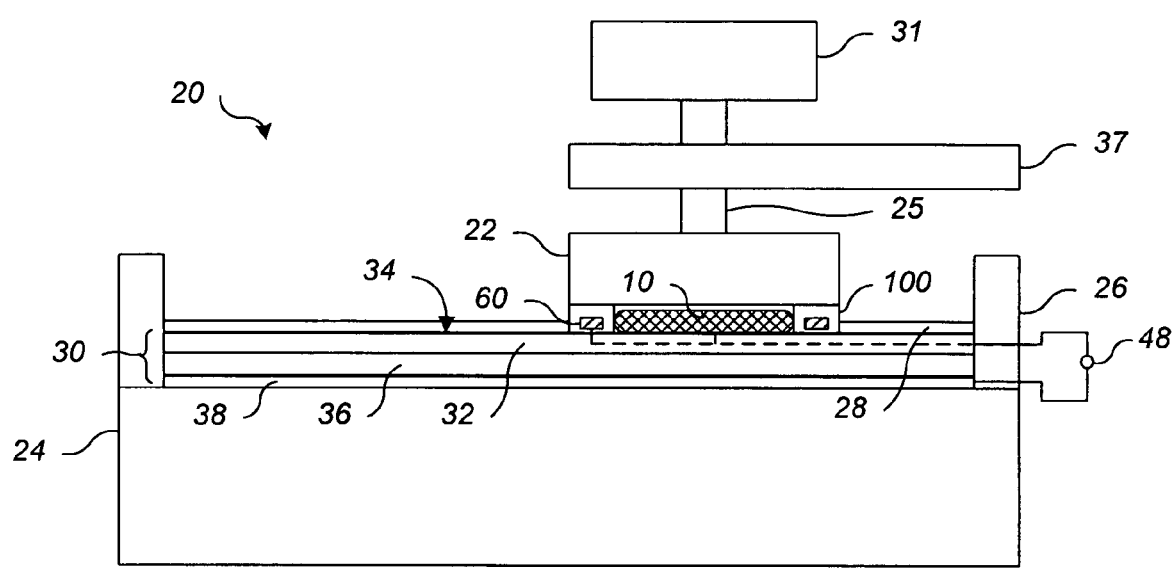
FIG. 1 is a schematic side view, partial cross-section of an ECMP polishing station.

As can be seen in FIG. 1, a substrate 10 can be polished at a polishing station 20 of an ECMP apparatus. An ECMP apparatus can have multiple polishing stations, but only one is shown for the sake of simplicity. A description of a similar conventional CMP polishing apparatus can be found in U.S. Pat. No. 5,738,574, the entire disclosure of which is incorporated herein by reference. Two fundamental differences between the ECMP apparatus and a conventional CMP polishing apparatus are, first, that in the ECMP polishing process an electrolyte is used on the platen and, second, that an electrical bias is applied to the substrate. In addition, the ECMP process may be conducted at a lower rotation speed during polishing, both to reduce stress on the substrate and to prevent splashing of the electrolyte.

The polishing station 20 includes a rotatable platen 24 on which is placed a polishing pad assembly 30. Each polishing station 20 can also include a pad conditioner apparatus (not shown) to maintain the condition of the polishing pad so that the polishing pad will effectively polish substrates. The edge of the platen 24 has a barrier wall or weir 26 so that a polishing electrolyte 28 can be contained on the polishing pad assembly 30 during polishing. An example of suitable electrolyte for ECMP polishing is described in U.S. Pat. No. 6,811,680, the entirety of which is incorporated by reference. Electrolyte solutions used for electrochemical processes such as copper plating and/or copper anodic dissolution are available from Shipley Leonel, in Philadelphia, Pa., under the tradename Ultrafill 2000, and from Praxair, in Danbury, Conn., under the tradename EP3.1. Optionally, the polishing electrolyte 28 can include abrasive particles. The polishing electrolyte can be supplied through ports in the surface of the polishing pad, or through a polishing liquid delivery arm (not shown).

The polishing pad assembly 30 can include a non-conductive polishing layer 32 with a polishing surface 34, a non-conductive backing layer 36 that can be softer than the polishing layer 32, and a counter-electrode layer 38 which abuts the surface of platen 24. The polishing layer 32 and the backing layer 36 can be a conventional two-layer polishing pad. The polishing layer 32 can be composed of foamed or cast polyurethane, possibly with fillers, e.g., hollow microspheres, and/or a grooved surface, whereas the backing layer 36 can be composed of compressed felt fibers leached with urethane. The counter-electrode layer 38, backing layer 36 and polishing layer 32 can be assembled as a single unit, e.g., the counter-electrode 38 can be adhesively attached to the backing layer 36, and the resulting polishing pad assembly 30 can then be secured to the platen.

Figure 2A:
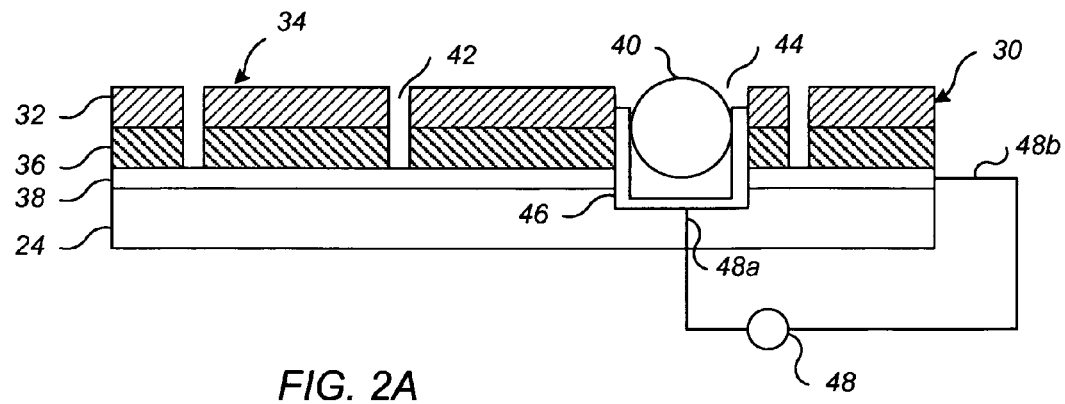
FIG. 2A shows a schematic of a cross sectional view of an ECMP polishing station having conductive rollers.

As noted above, the ECMP apparatus applies an electrical bias to the substrate 10. A variety of techniques are available to apply this electrical bias. As shown in FIG. 2A, in one implementation, the bias is applied by electrodes that extend through apertures in a non-conductive dielectric polishing layer to contact the substrate 10 during polishing. The one or more apertures 44 can be formed through both the pad layers 32, 36 and the counter-electrode layer 38. The electrodes can be rotatable conductive spheres (rollers) 40 that are secured in the aperture 44 and extend slightly above the polishing surface 34. Each conductive roller 40 can be captured by a housing 46. In addition, perforations 42 can be formed through the polishing layer 32 and the backing layer 36 to expose the counter-electrode layer 38. A voltage source 48 can be connected to the conductive rollers 40 and the counter-electrode layer 38 by electrical contacts 48a and 48b (e.g., conductive electrical contacts embedded in a non-conductive platen), respectively, to apply a voltage difference between the rollers 40 and the counter-electrode layer 38. Such a system is described in U.S. Pat. No. 6,884,153, the entirety of which is incorporated herein by reference.

Figure 2B:
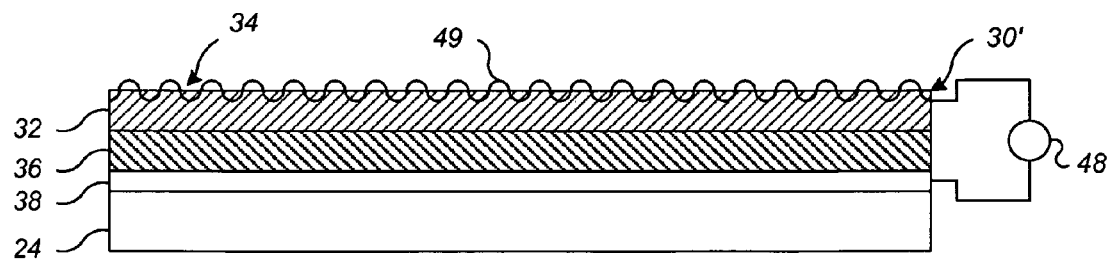
FIG. 2B shows a schematic of a cross sectional view of an ECMP polishing station having a conductive element in or on the polishing surface of a polishing pad.

As shown in FIG. 2B, in another implementation, the bias is applied by electrodes that are embedded in a non-conductive dielectric polishing layer. The polishing pad assembly 30' includes a non-conductive polishing layer 32 with a polishing surface 34, a non-conductive backing layer 36 that can be softer than the polishing layer 32, and a counter-electrode layer 38 which abuts the surface of platen 24. A conductive element 49, such as a metal wire, is embedded in the non-conductive dielectric polishing layer 32. At least part of the conductive element 49 projects above the polishing surface 34 in order to contact the substrate during polishing. A voltage difference is applied between the conductive element 49 and the counter-electrode layer 38 by the voltage source 48. Such a polishing pad and the associated polishing system is described in the aforementioned U.S. Pat. No. 6,884,153.

Figure 2C:
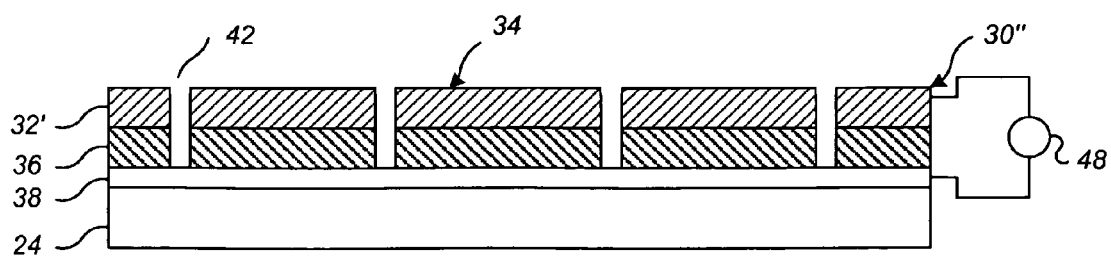
FIG. 2C shows a schematic of a cross sectional view of an ECMP polishing station having a conductive polishing surface.

As shown in FIG. 2C, in another implementation, the polishing layer itself is conductive and applies the bias. For example, referring to FIG. 2C, the polishing pad assembly 30'' includes a conductive polishing layer 32' with a polishing surface 34, a non-conductive backing layer 36, and a counter-electrode layer 38 which abuts the surface of platen 24. The conductive polishing layer 32' can be formed by dispersing conductive fillers, such as fibers or particles (including conductively coated dielectric fibers and particles) through the polishing pad. The conductive fillers can be carbon-based materials, conductive polymers, or conductive metals, e.g., gold, platinum, tin, or lead. A voltage difference is applied between the conductive polishing layer 32' and the counter-electrode layer 38 by the voltage source 48. Such a polishing pad and the associated polishing system is described in the aforementioned U.S. Pat. No. 6,884,153.

Referring again to FIG. 1, a carrier head 22 brings the substrate 10 to the polishing station 20. The carrier head 22 is connected by a carrier drive shaft 25 to a carrier head rotation motor 31 so that the carrier head can independently rotate about its own axis. In addition, the carrier head 22 can independently laterally oscillate in a radial slot formed in a support plate of a rotatable multi-head carousel 37. A description of a suitable carrier head 22 can be found in U.S. Pat. Nos. 6,422,927 and 6,450,868, and in U.S. Pat. No. 6,857,945, the entire disclosures of which are incorporated herein by reference.

In operation, the platen 24 is rotated about its central axis, and the carrier head 22 is rotated about its central axis and translated laterally across the polishing surface 34 of the polishing pad to provide relative motion between the substrate 10 and the polishing pad 30. The carrier head 22 places a controllable pressure on the substrate 10 during polishing. The carrier head 22 also retains the substrate 10 with a retaining ring 100 that is secured to the carrier head. The retaining ring 100 has a conductive portion 60. The retaining ring has a substantially annular body.

As shown in FIGS. 3A-3D, the retaining ring 100 includes a conductive portion. The conductive portion can include one or more bodies formed of a conductive material. The conductive material can be a metal, such as a noble metal, including but not limited to copper, gold, platinum, palladium, rhodium or iridium. Different metals can react in one of three ways when exposed to the ECMP process. Electrolytic dissolution dissolves the metal into the electrolyte solution, oxygen evolution forms oxygen gas bubbles, and oxidation can cause a non-conductive coating to form on the metal. The one or more conductive bodies can be coupled together so that current can be transferred from one body to a neighboring body or the conductive bodies can be electrically insulated from one another. The conductive body can be in the form of a conductive ring 134. The conductive ring 134 can be solid and relatively thick, or it can be a thin layer plated onto a second material.

The conductive ring 134 surrounds, at least in part, a portion that is non-rigid as compared to the conductive portion. That is, a non-rigid portion 61 includes a material that is less rigid than the material that forms the conductive ring 134, but the non-rigid portion 61 still has a rigid characteristic. The retaining ring 100 has an inner diameter surface 107 that comes into contact with the substrate 10 during polishing. At least the lower portion of inner diameter surface 107 includes the non-rigid portion 61. The non-rigid portion 61 can be formed of a material that is inert to the polishing process and is sufficiently compressible to prevent the substrate 10 from chipping or cracking when an edge of the substrate 10 contacts the inner diameter surface 107 of the retaining ring 100. However, the retaining ring 100 should not be formed of a material that is elastic enough to extrude into the substrate receiving recess 140 when the carrier head places a downward pressure on the retaining ring 100. The retaining ring 100 should also be durable and have a low wear rate, although it is acceptable for the retaining ring 100 to wear away. The non-rigid portion 61 can have a shore hardness of between 75-100 D, such as between 80-95 D. For example, the retaining ring 100 can be made of a plastic, such as polyphenylene sulfide (PPS), polyethylene terephthalate (PET), polyetheretherketone (PEEK), polybutylene terephthalate (PBT), polytetrafluoroethylene (PTFE), polybenzimidazole (PBI), polyetherimide (PEI), or a composite material.

Figure 3A:
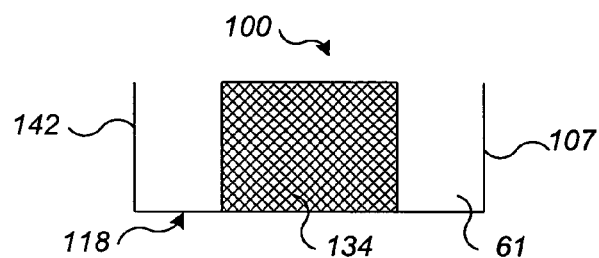
FIGS. 3A-3D show multiple partial cross-sectional views of different implementations of retaining rings with a conductive portion.
Figure 3B:
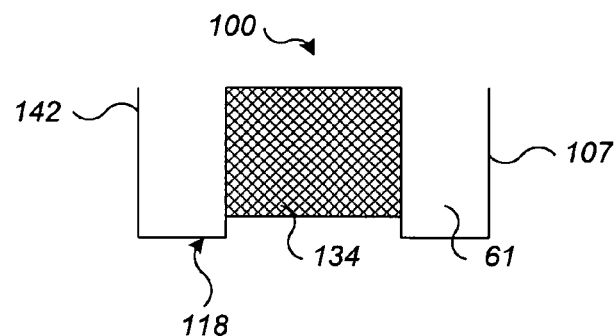
Figure 3C:
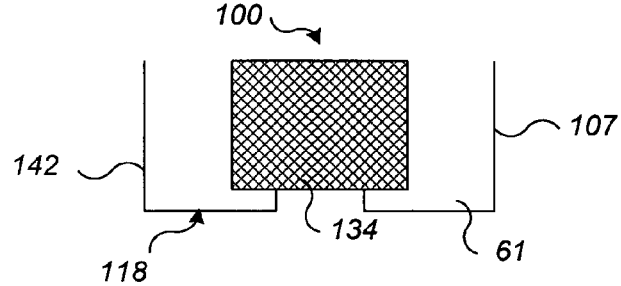
Figure 3D:
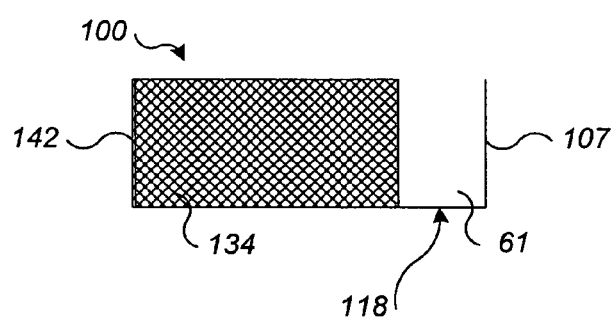

The non-rigid portion 61 is joined to the conductive ring 134 such that at least an inner diameter surface 107 of the retaining ring 100 includes the non-rigid portion 61. The non-rigid portion 61 can also be positioned along other surfaces of the conductive ring 134, including the upper surface, the lower surface and the surface that forms the outer diameter surface 142 of the retaining ring 100. The retaining ring 100 has a lower surface 118 that contacts the polishing surface 34 during polishing. The conductive ring 134 can be flush with the lower surface 118 of the retaining ring 100, as shown in FIGS. 3A and 3D, or recessed from the lower surface of the retaining ring 118, as shown in FIGS. 3B and 3C. The lower surface of the conductive ring 134 can be fully exposed, as shown in FIGS. 3A, 3B and 3D, or partially exposed, as shown in FIG. 3C. A conductive ring 134 that is at least partially exposed can at least interact with the electrolyte solution used in the ECMP processing.

Figure 4:
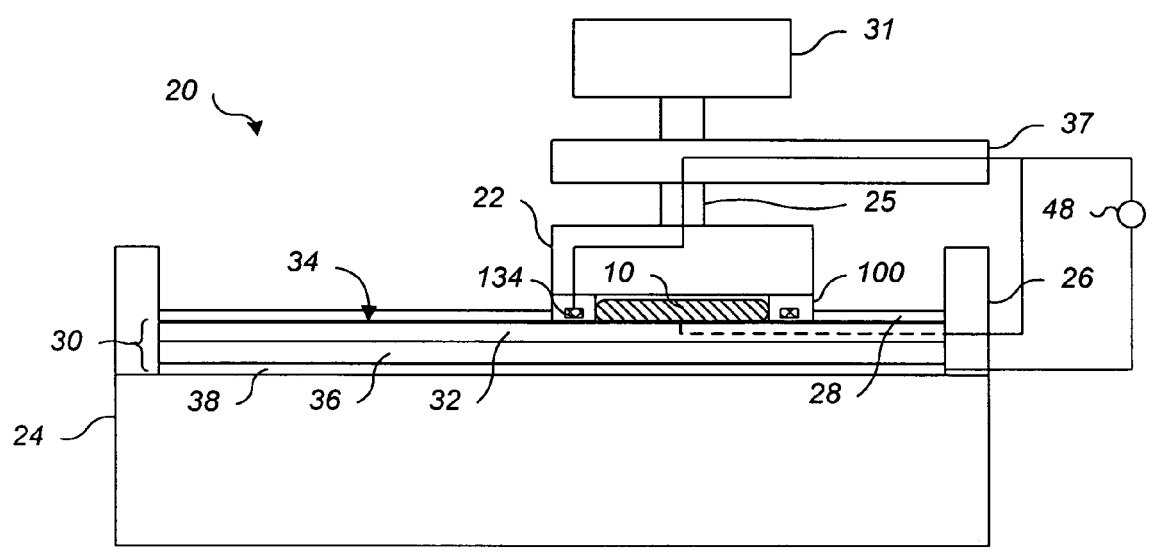
FIG. 4 is a schematic side view, partial cross-section of an ECMP polishing station with a retaining ring having a conductive portion.

Referring to FIG. 4, in some implementations, the retaining ring has a conductive portion 134 that is partially encapsulated by the non-rigid portion 61 of the retaining ring 100 and is in electrical contact with a voltage source 48. In one implementation, the voltage source 48 is the same voltage source that is in electrical contact with the conductive elements of the polishing pad assembly.

Figure 5A:
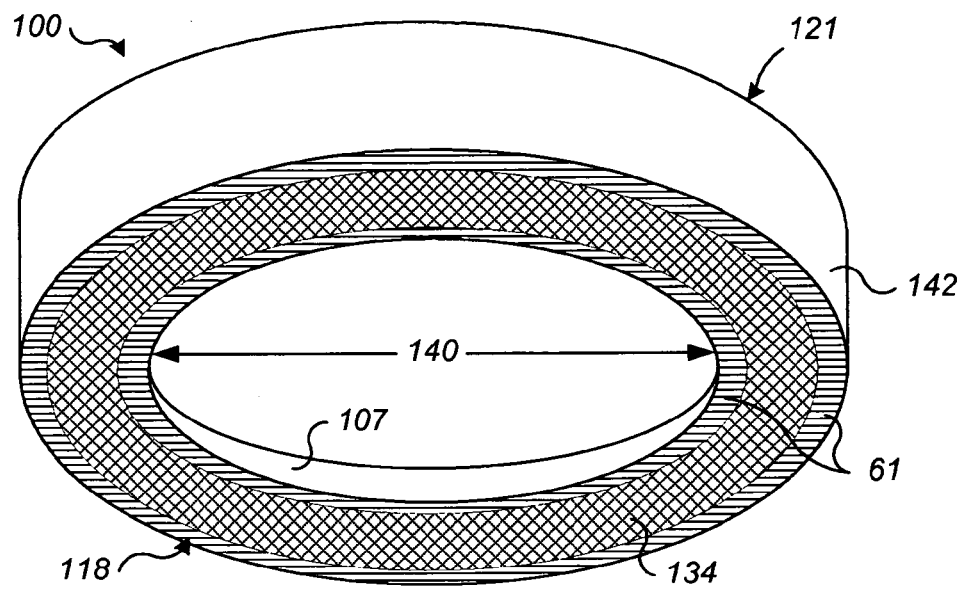
FIG. 5A is a perspective view of a retaining ring with a conductive portion.

Referring to FIG. 5A, in one implementation, the retaining ring 100 has an upper surface 121 that contacts the carrier head 22. The substrate receiving recess 140 of the retaining ring 100 is sufficiently large to accommodate a substrate 10. For a 300 mm substrate, the substrate receiving recess 140 is at least 300 mm. In the implementation shown, the conductive portion 134 does not extend to the outer diameter surface 142.

Figure 5B:
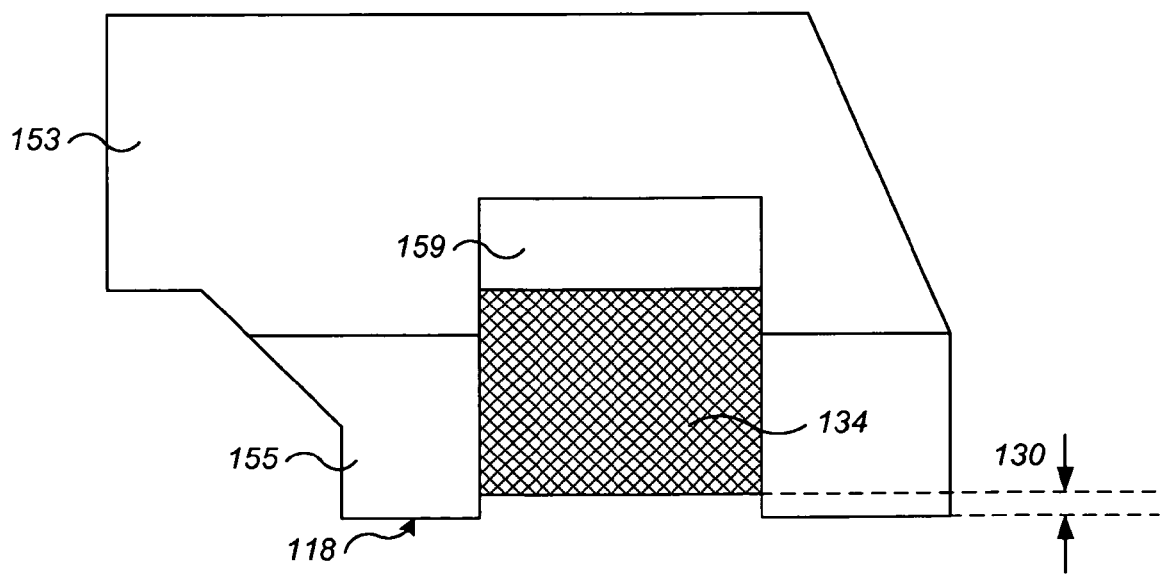
FIG. 5B is a cross-sectional view of one implementation of a retaining ring for use with an ECMP system.

Referring to FIG. 5B, in some implementations, the retaining ring 100 is formed from an upper ring portion 153 and a lower ring portion 155. The upper ring portion 153 can be formed from a harder material than the lower ring portion 155. In one implementation, the upper ring portion 153 is formed from a metal, such as stainless steel. A cavity 159 is formed in the lower ring portion 155. In some implementations, the cavity 159 can extend into the upper ring portion 153. The conductive ring 134 is secured in the cavity 159, such as by pressure fitting the conductive ring 134 into the cavity. The conductive ring 134 can also be secured with an adhesive, such as an epoxy. The bottom of the conductive ring 134 is recessed from the lower surface 118, thereby forming a gap 130 between the conductive ring 134 and the polishing surface 34 when the retaining ring 100 contacts the polishing surface 34. Typically the material of the non-rigid portion 61 of the lower ring portion 155 wears away as the ring is used. If a conductive ring 134 is formed from a metal that dissolves during the ECMP processing, the conductive ring 134 wears away as well. The gap 130 between the conductive ring 134 and the polishing pad can change as the lower surface 118 of the retaining ring 100 wears away. If the cavity 159 in which the conductive ring 134 is secured is sufficiently deep, the conductive ring 134 can be pushed up into the cavity 159 to maintain the gap at a desired depth.

Figure 6A:
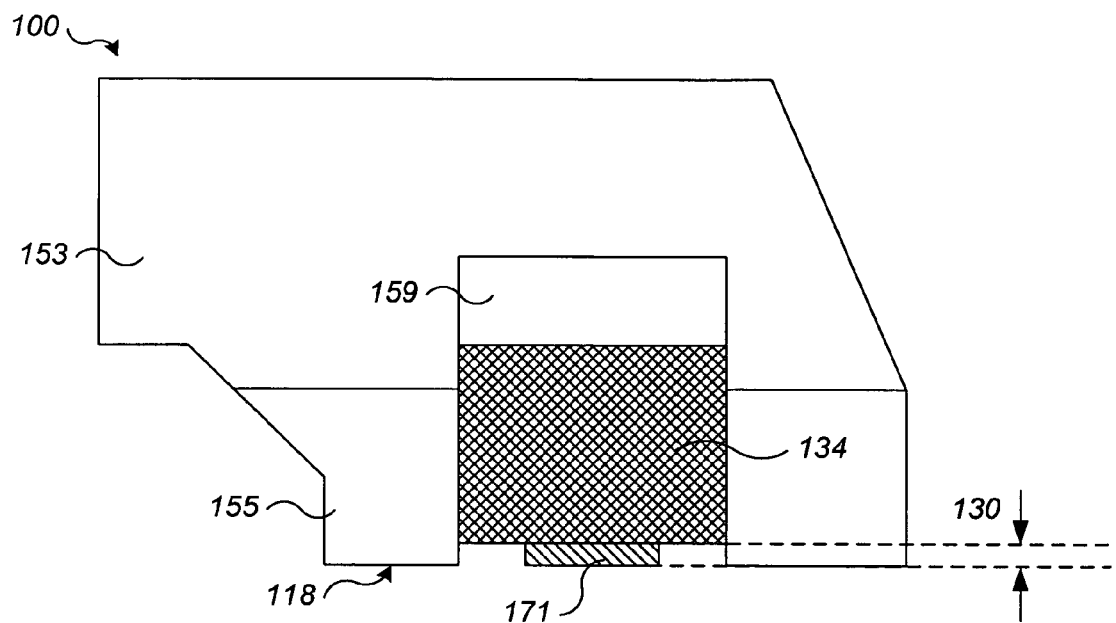
FIG. 6A is a cross-sectional view of one implementation of a retaining ring for use with an ECMP system.
Figure 6B:
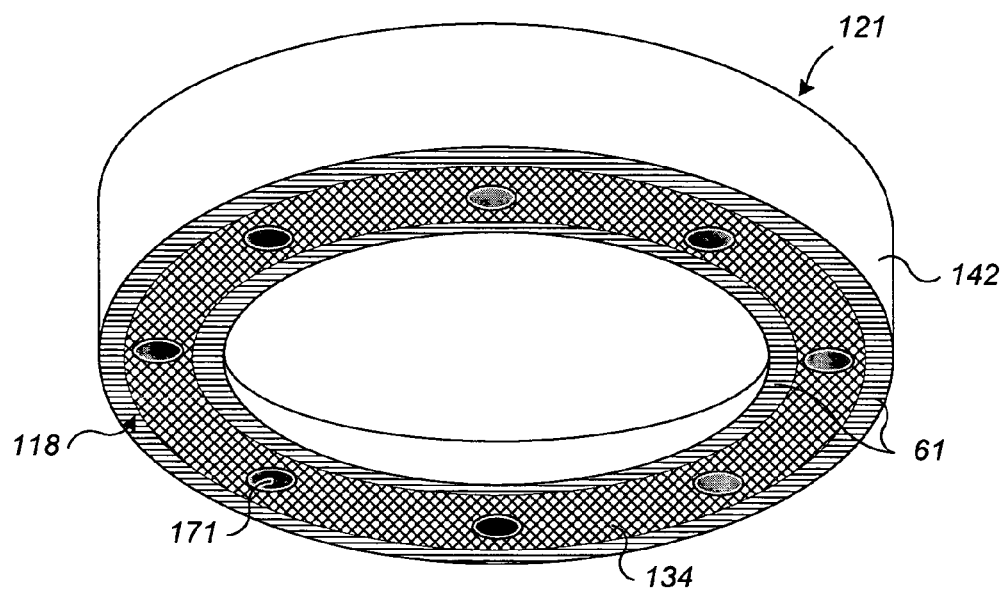
FIGS. 6B and 6C are perspective views of a retaining ring with a conductive portion and one or more spacers.
Figure 6C:
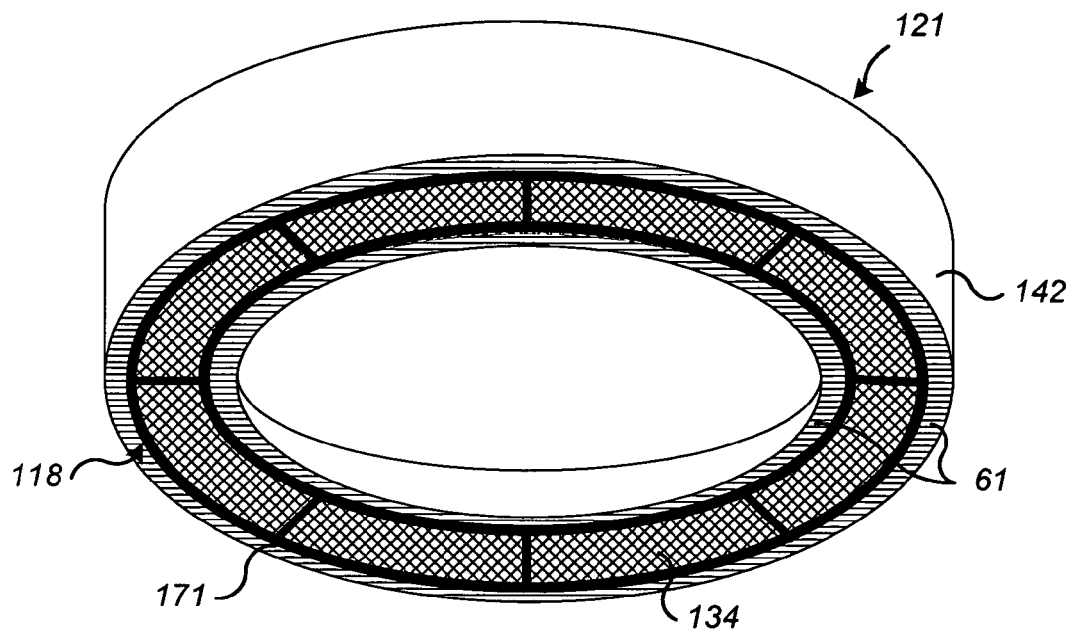

As shown in FIGS. 6A, 6B and 6C, in one implementation, a spacer 171 is located between the conductive ring 134 and the polishing surface 34. The spacer 171 can control the gap 130 between the lower surface 118 of the retaining ring 100 and the lower surface of the conductive ring 134. This enables the gap to remain constant throughout the life of the retaining ring 100. The spacer 171 is dimensioned so that the conductive elements of the polishing pad assembly 30 can contact the conductive ring 134, as described further below with reference to FIG. 9. The spacer 171 is formed of a material inert to the ECMP process. The spacer 171 is formed of either a non-conductive material or a conductive material. In one implementation, the spacer 171 is formed of stainless steel. Spacers 171 can be formed as individual spacer units that are secured to the conductive ring 134 or the retaining ring 100. The spacers can be secured by press fitting into the cavity. The spacers can also be formed as one piece, such as a ring with openings, that allows for electrical contact between the conductive portion of the polishing pad assembly 30 and the conductive ring 134.

Figure 7A:
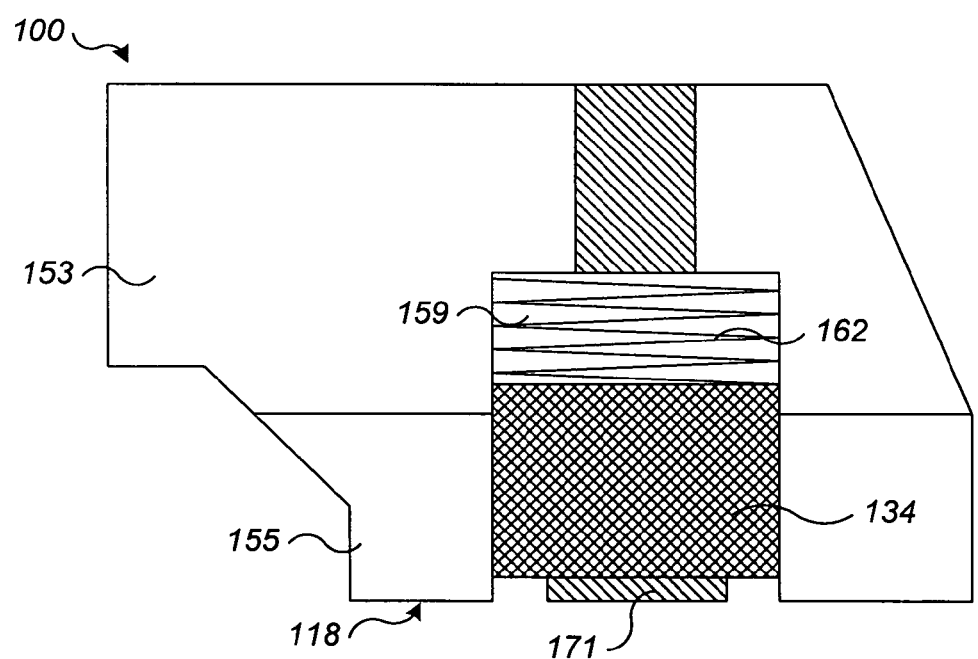
FIG. 7A is a cross-sectional view of a retaining ring with a spring-loaded conductive ring.

Referring to FIG. 7A, in one implementation, the retaining ring includes a mechanism for maintaining contact between the spacer 171 and the polishing surface. The mechanism can be a spring 162, or any other appropriate mechanical device for applying a downward force to the conductive ring 134.

Figure 7B:
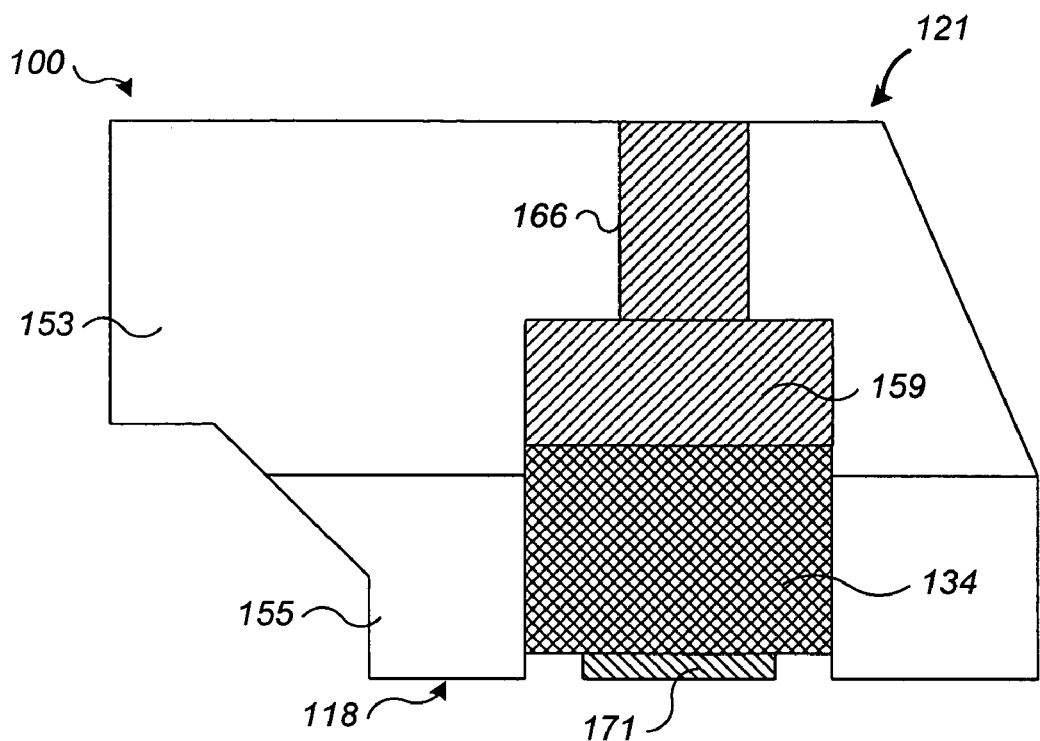
FIG. 7B is a cross-sectional view of a retaining ring with a controllably positionable conductive ring.

Referring to FIG. 7B, in one implementation, the conductive ring 134 is controllably positionable. A pressure regulator (not shown) can be coupled to an aperture 166 formed in the upper surface 121 of the retaining ring 100. The pressure regulator can be located in the carrier head or in a structure coupled to the carrier head. The pressure regulator can actuate the conductive ring 134 as follows. The pressure in the cavity 159 can be increased, forcing the conductive ring towards the polishing surface 34. The conductive ring 134 can contact the conductive surface 34 in some instances. The pressure in the cavity can be decreased, such as by forming a vacuum, pulling the conductive ring 134 away from the polishing surface. The conductive ring 134 is secured in the retaining ring 100 such that the conductive ring can move up and down within the cavity 159. A spacer may optionally be used with this implementation of the retaining ring.

Figure 8:
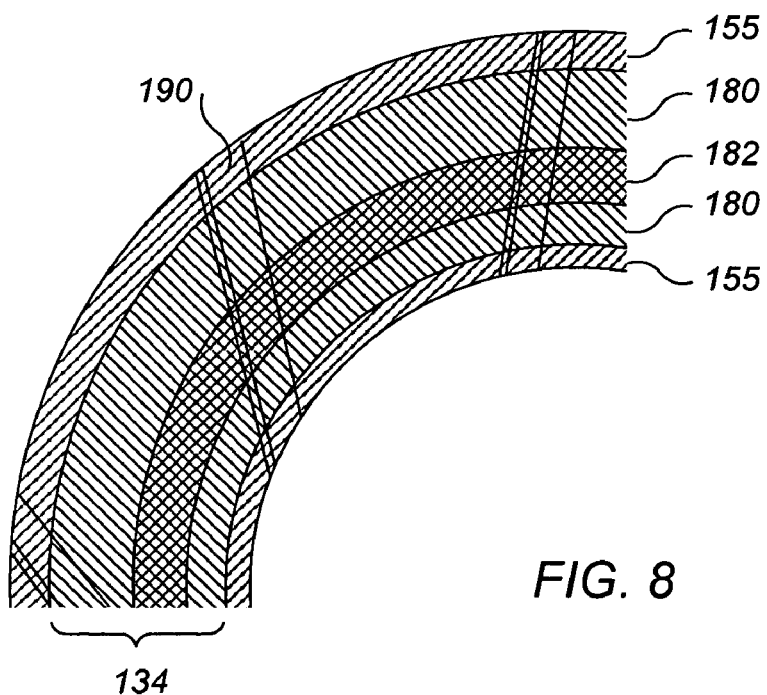
FIG. 8 is a bottom view of a portion of a retaining ring with grooves.

The conductive portion can include more than one conductive material. The conductive ring 134 can include a single band of a first material that interacts with the ECMP process, such as a metal that is dissolved into the electrolyte solution or forms gas bubbles, and one or more bands of a second material that interacts less with the ECMP process, such as a metal that is does not dissolved into the electrolyte solution or does not cause oxygen evolution to occur. The second metal makes electrical contact with the conductive element of the polishing pad assembly 30 and conducts voltage to the first metal. For example, as shown in FIG. 8, two annular bands 180 of the first metal, such as stainless steel, can surround an annular band 182 of the second metal, such as copper, gold or platinum. The first metal can take up a smaller percentage of the total width of the ring than the second metal, such as around 25%. Additional bands of the first metal can also be formed in the conductive ring 134.

Any features formed into the bottom of the retaining ring can also be formed in the bottom surface of the conductive ring 134. In one implementation, grooves 190 are formed in the lower surface 118 of the lower ring portion 155, and the grooves 190 are formed into the conductive ring 134 as well. The grooves 190 enable transport of the polishing electrolyte 28 from outside of the retaining ring 100 to the recess 140 of the retaining ring.

Figure 9:
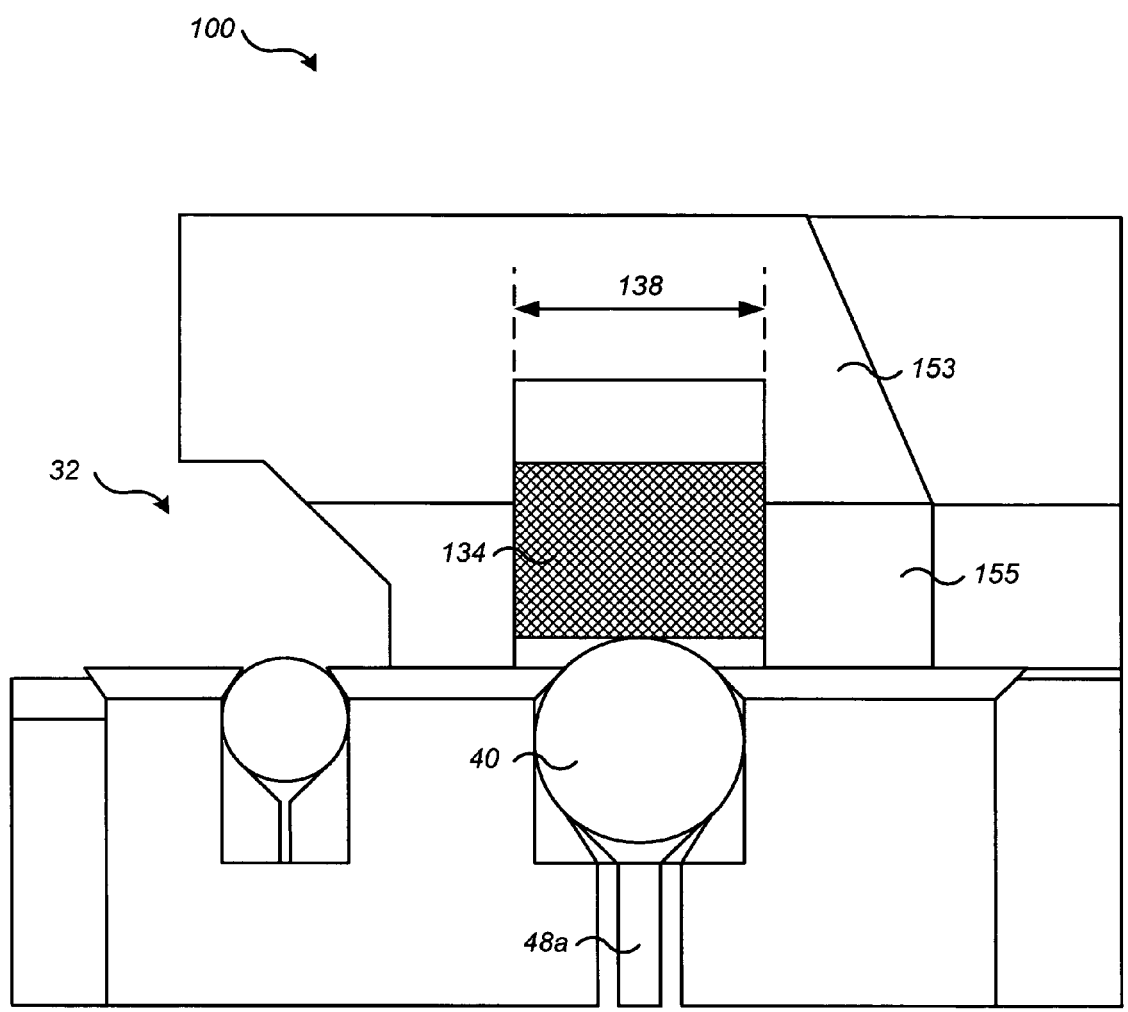
FIG. 9 is a cross-sectional perspective view of a retaining ring with a conductive portion in contact with an electrode of an ECMP system.

As shown in FIG. 9, the conductive ring 134 is positioned within the retaining ring 100 so that the conductive portions of the polishing pad assembly 30 contact the conductive ring 134. The height of the spacers 171 (as shown in FIG. 6) should be sufficiently small that the conductive elements of the polishing pad assembly 30 can contact the conductive ring 134. In the implementation shown, conductive spheres 40 extend above the polishing layer 32. The spacers 171 are thinner than or equal to the thickness of the exposed portion of the spheres 40. The width 138 of the conductive ring 134 is sufficient to make reliable electrical contact with the conductive spheres 40. Typically, two or more spheres 40 are simultaneously in contact with the conductive ring 134 at any given time during polishing.

Figure 10:
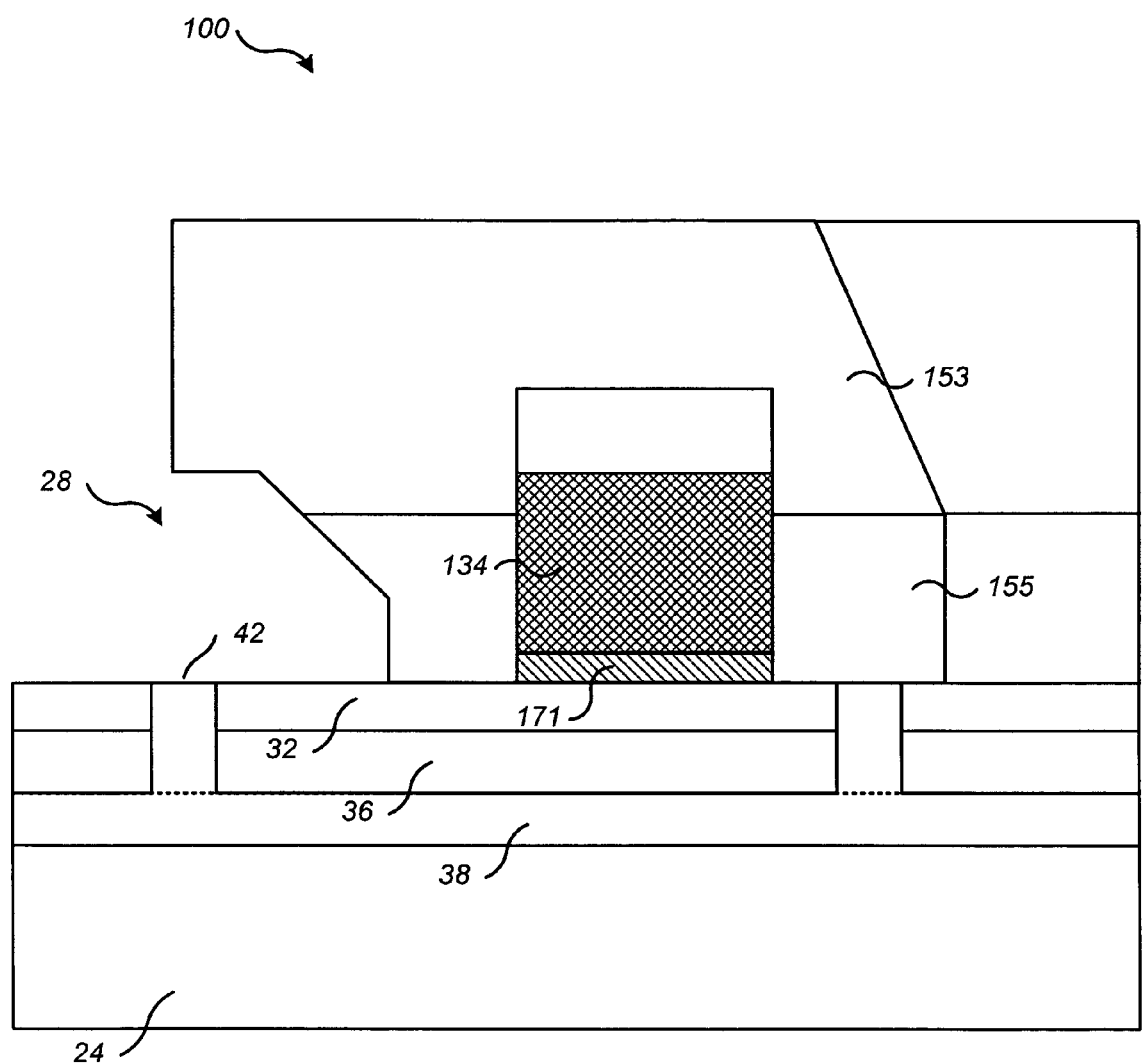
FIG. 10 is a cross-sectional view of a retaining ring with a spacer in contact with a conductive polishing layer of a polishing apparatus.

Referring to FIG. 10, the conductive ring can also be used with polishing pad assemblies that do not have protruding electrodes for biasing the conductive ring. When the polishing pad assembly 30 includes a conductive polishing layer 32 or a non-conductive polishing layer with an embedded conductive element, a conductive spacer 171 can be placed between the conductive ring 134 and the polishing surface 34 to enable the conductive polishing layer 32 to bias the conductive ring 134. The conductive spacer 171 can be formed of stainless steel or another suitable low conductivity metal.

Figure 11:
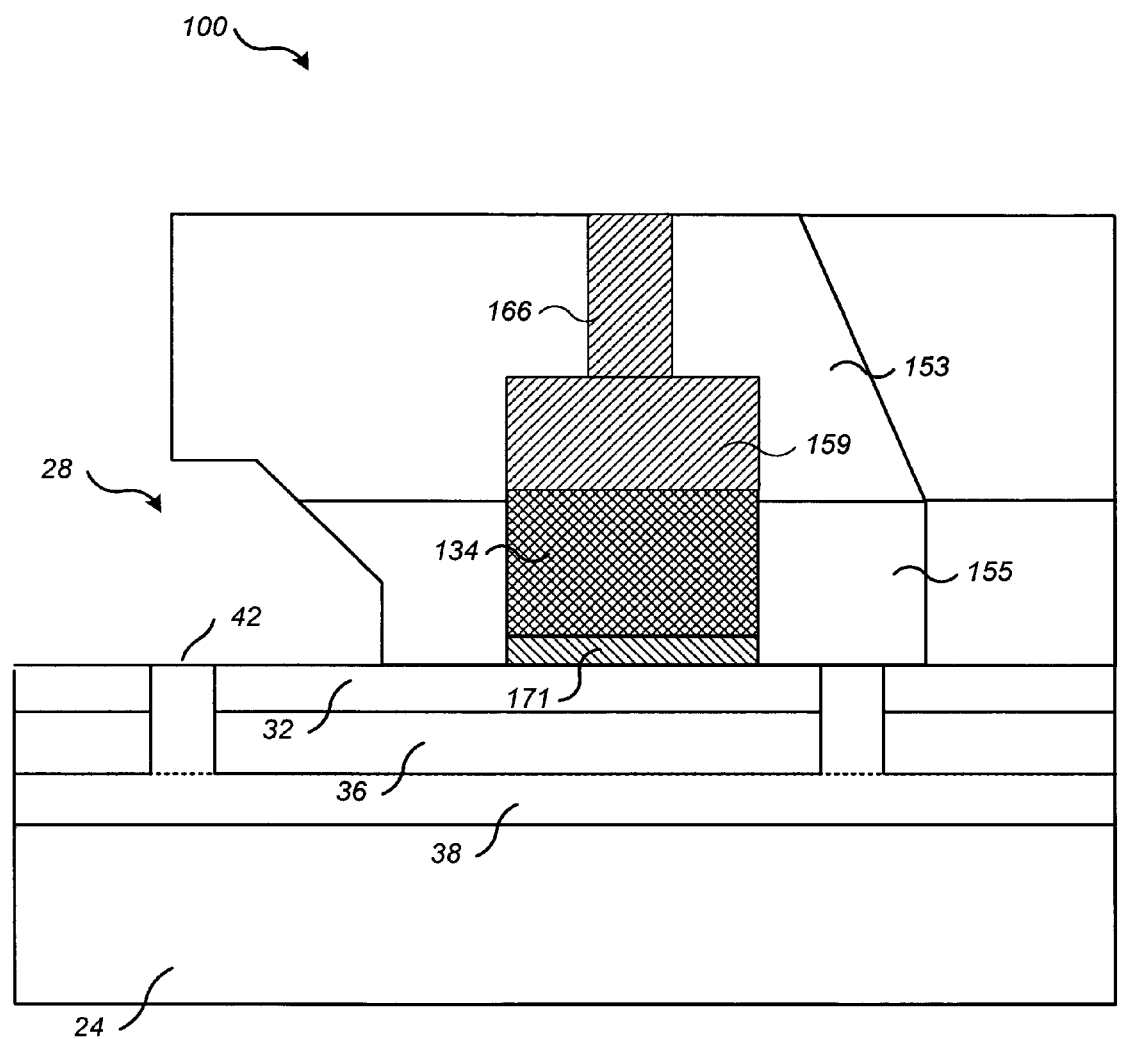
FIG. 11 is a cross-sectional view of a retaining ring with a controllably positionable conductive portion in contact with conductive polishing layer of a polishing apparatus.

Referring to FIG. 11, a controllably positionable conductive ring 134 can be placed against a polishing surface. To move the conductive ring 134 against the polishing surface, a pressure regulator (not shown) increases the pressure in the cavity 159 in which the conductive ring 134 is secured. To move the conductive ring 134 away from the polishing surface, the pressure regulator decreases the pressure in the cavity 159 to form a vacuum.

In one implementation, a standard retaining ring 100 without a conductive portion is used to polish the substrate. A conducting member that is insulated in a manner similar to the conductive retaining ring 100 described above can be placed on the polishing surface. The conductive member can be placed close to the substrate being polished. In one implementation, the conductive member surrounds a non-conductive retaining ring. In this implementation, the conductive member need not rotate with the non-conductive retaining ring. When the carrier head moves from one platen to a subsequent platen, the conductive member can remain on the first platen, rather than following the carrier head to the next platen.

Using one or a combination of the features described above, a substrate can be polishing using the ECMP process. A carrier head transfers the substrate to the polishing station where the surface of the substrate to be processed is brought into contact with the polishing surface of the polishing pad assembly. A suitable electrolyte solution is supplied to the polishing surface.

A voltage source that is electrically coupled to the counter-electrode layer is powered. The voltage source is electrically coupled to a conductive element that can contact the substrate directly and the conductive ring of the retaining ring directly or indirectly, such as an electrode, electrical wire or conductive pad, as described above. The substrate and conductive ring are biased when the conductive element is in electrical contact with the substrate and the conductive ring.

Relative motion is created between the polishing pad assembly and the substrate. The motion can be caused by one or more actions, including the carrier head moving the substrate, the carrier head rotating and the platen rotating. As the substrate is processed, copper is removed from the substrate into the electrolyte solution.

Electrically biasing the conductive portion of a retaining ring can improve copper uniformity between the edge of the substrate 10 and the center of the substrate 10. Without being bound to any particular theory, including the conductive portion in the retaining ring may ensure that a substantially uniform voltage is applied across the edge zone of the substrate, thereby improving uniformity of the electrolytic dissolution across the edge of the substrate. In particular, without the conductive ring, ECMP can cause overpolishing at the edges. It is hypothesized that this edge effect is created by non-uniformity of the voltage caused by the substrate edge. However, adding the conductive ring can effectively control the potential of the electrolyte at the edge of the substrate and extends the edge of the conductive area, moving the source of the voltage non-uniformity away from the edge of the substrate. That is, the edge of the area to which a non-uniform voltage is applied is no longer the edge of the substrate, but beyond the edge of the substrate. Locally, at the edge of the substrate, the potential can be more uniform.

The spacers can keep at least a part of the conductive portion from contacting the polishing pad assembly 30. If the conductive portion is formed from copper, contact between the copper and the polishing pad 30 can cause a chemical reaction to wear away the conductive portion. Preventing the chemical reaction reduces loss of the copper material of the conductive ring during polishing. The conductive portion and the non-conductive portion of the retaining ring are generally formed from different materials that wear at different rates. Including the spacers 171 in the retaining ring 100 can maintain the flatness across the lower surface 118 of the retaining ring 100 and the area in which the conductive ring is located, particularly if the bottom of the retaining ring 100 wears away during polishing.

Using two metals for the conductive portion allows for forming a narrow band of a first metal that interacts more strongly with the electrolyte solution during processing. If a current-based endpoint detection system is used in combination with the ECMP apparatus, such as that described in U.S. Publication No. US 2004-0182721 A1, the entire disclosure of which is incorporated herein by reference, and the conductive ring is formed from copper, the copper may interfere with the endpoint detection. Specifically, dissolution of copper from the conductive body can create noise that offsets the current signal created for dissolution of copper from the substrate. Limiting the amount of current generated by the metal ring, that is, reducing the area of the conductive portion, can reduce the interference. In one implementation, the portion of the ring that includes the high conductivity metal is as small as possible, yet large enough to move the edge effects away from the edge of the substrate. Forming the conductive portion of a low and a high conductivity metal can form a sufficiently wide conductive ring to ensure contact between the conductive element of the polishing pad assembly 30 and the conductive portion. The second material conducts the applied voltage to the first metal. The desired effect of moving the edge effect away from the substrate edge can be achieved by allowing the low conductivity metal to transfer the voltage to the high conductivity metal. Simultaneously, reducing the area of the conducting ring's high conductivity metal reduces the interference with the endpoint detection. In addition, the second metal can be less expensive than the first metal, making the ring less expensive to produce.

Forming the conductive portion from the same material that is being removed from the substrate, such as copper, can increase the uniformity of the ECMP polishing process effects across the edge of the substrate and move the edge effect out to the retaining ring. Copper is typically compatible with the chemistry of the substrate. Some other metals, such as nickel, can diffuse into the substrate and cause a device formed from the substrate to be unusable. Using other materials, such as gold, platinum, palladium or silver, can increase the life of the conductive portion. If copper contacts the polishing surface, the copper can be acted upon in the same manner as the copper that is being removed from the substrate. Other non-cuprous metals are not acted upon in the same way as the copper, that is, oxygen evolution can occur instead of electrolytic dissolution, and the non-cuprous metal is not removed as quickly, if at all, from the conductive portion. With metals such as gold, oxygen evolution can occur.

Forming the lower ring portion 155 from a material that is inert to the polishing process and not prone to chipping or cracking the substrate provides a suitable edge for contacting the substrate 10 and decreases the likelihood of damaging the substrate 10. Securing a conductive portion in a retaining ring of such an inert material allows for both the benefits of a conductive material and the benefits of the inert material, as described above.

Forming the conductive portion so that the conductive portion can be actuated within the retaining ring allows for the conductive portion to be moved and the gap cleaned. Debris that collects in the retaining ring can be washed away. If an ECMP system has multiple platens for polishing the substrate, the rate of polishing the substrate edge can be controlled by moving the conductive portion against the polishing surface or away from the polishing surface. Forming the conductive portion so that it can be actuated allows for more process control.

Independently biasing the conductive portion of the ring through the carrier head as opposed to biasing the conductive portion with a conductive element of the polishing pad assembly 30 allows for forming a smaller conductive portion. Less conductive material is required for making contact with the electrolyte. A multi-banded conductive portion, such as that shown in FIG. 8, is unnecessary.

A number of embodiments of the invention have been described. Nevertheless, it will be understood that various modifications may be made without departing from the spirit and scope of the invention. For example, the retaining ring can be used with a polishing apparatus other than a polishing pad, such as a polishing belt. The recess in which the conductive ring is secured can be sized to fit the ring without leaving a cavity between the retaining ring and the conductive ring. The conductive ring can be replaced with two or more individual conductive bodies. Accordingly, other embodiments are within the scope of the following claims.

All references cited herein are incorporated by reference in their entirety for all purposes.

What is claimed is:

1. A retaining ring for electrochemical mechanical processing, comprising:
    a conductive portion having a lower surface, wherein the lower surface is exposed to an electrochemical mechanical processing (ECMP) environment; and
    a substrate contacting portion forming an inner diameter surface, the substrate contacting portion formed of a material that is less rigid than the conductive portion.

2. The retaining ring of claim 1, wherein the substrate contacting portion is formed of a material that is sufficiently compressible to substantially prevent damage to a substrate caused by contact between the inner diameter surface and the substrate.

3. The retaining ring of claim 1, wherein the lower surface of the conductive portion is not planar with the lower surface of the substrate contacting portion such that a gap is formed between the lower surface of the conductive portion and a plane defined by a lower surface of the substrate contacting portion.

4. The retaining ring of claim 3, further comprising a spacer that contacts the lower surface of the conductive portion.

5. The retaining ring of claim 4, wherein the spacer includes a conductive material.

6. The retaining ring of claim 4, wherein the spacer includes a non-conductive material.

7. The retaining ring of claim 4, wherein the spacer includes a material that is substantially inert to a polishing process.

8. The retaining ring of claim 1, wherein the conductive portion has an annular shape forming an annular conductive ring with an inner diameter surface, an outer diameter surface, an upper surface and a lower surface.

9. The retaining ring of claim 8, wherein the inner diameter surface and the outer diameter surface of the annular conductive ring contact the substrate contacting portion.

10. The retaining ring of claim 1, wherein:
    the conductive portion has an annular shape forming an annular conductive ring; and
    the annular conductive ring includes a first metal and a second metal, wherein the first metal interacts more with an electrolyte solution used in processing the substrate than the second metal interacts with the electrolyte solution.

11. The retaining ring of claim 10, wherein the annular conductive ring includes about 25% of the first metal.

12. The retaining ring of claim 10, wherein:
    the first metal and the second metal form concentric annular rings; and
    the first metal is positioned between the inner diameter surface of the annular body and the second metal.

13. The retaining ring of claim 12, wherein:
    the first metal includes copper; and
    the second metal includes stainless steel.

14. The retaining ring of claim 1, wherein the conductive portion is formed from at least one metal from the group of metals consisting of copper, gold, platinum and palladium.

15. The retaining ring of claim 1, wherein the conductive portion has a core of a first metal and the core is plated with a second metal.

16. A method of forming a retaining ring for electrochemical mechanical processing, comprising;
forming a conductive portion of a metal; and
forming an annular body of a material that is less rigid than the metal to define a substrate contacting portion, wherein the annular body has a lower surface that is configured to contact a polishing surface, an inner diameter surface that is configured to contact a substrate during polishing and a portion that is configured to contact the conductive portion; and
securing the conductive portion to the annular body so that the inner diameter surface of the annular body is exposed and at least part of the lower surface of the conductive portion is exposed to an electrochemical mechanical processing (ECMP) during polishing.

17. The method of claim 16, wherein:
forming the annular body includes forming a cavity in the annular body; and
securing the conductive portion to the annular body includes securing the conductive portion in the cavity.

18. The method of claim 16, wherein securing the conductive portion to the annular body includes securing an annular conductive ring to the annular body.

19. The method of claim 16, wherein securing the conductive portion to the annular body includes securing the conductive portion such that a lower surface of the conductive portion is recessed from the lower surface of the annular body, such that when the retaining ring contacts a polishing surface, a gap is formed between the conductive portion and the polishing surface.

20. The method of claim 19, wherein securing the conductive portion to the annular body includes forming the gap sufficiently thin enough to allow a conductive element of an electrochemical mechanical processing apparatus to electrically couple to the conductive portion during electrochemical mechanical processing and bias the conductive portion.

21. The method of claim 16, wherein securing the conductive portion to the annular body includes securing the conductive portion such that a lower surface of the conductive portion is at least partially encapsulated by the annular body.

22. The method of claim 16, wherein securing the conductive portion to the annular body includes securing the conductive portion such that a lower surface of the conductive portion is substantially planar with the lower surface of the annular body.

23. A method of electrochemically mechanically polishing a substrate, comprising:
retaining a substrate within a recess of a retaining ring, wherein the retaining ring includes a conductive portion having a lower surface, wherein the lower surface is exposed to the an electrochemical mechanical processing (ECMP) environment and a substrate contacting portion forming an inner diameter surface, the substrate contacting portion formed of a material that is less rigid than the conductive portion;
positioning the substrate adjacent to the inner diameter surface;
contacting a surface of the substrate to a polishing surface;
creating relative motion between the substrate and the polishing surface; and
electrically biasing the retaining ring and the substrate with the polishing surface.

24. A carrier head for electrochemical mechanical processing, comprising:
a base; and
a retaining ring attached to the base, wherein the retaining ring comprises:
a conductive portion having an upper surface and a lower surface; and
a substrate contacting portion forming at least part of an inner diameter surface, the substrate contacting portion formed of an insulating material and configured to contact a polishing surface during a polishing process;
wherein at least part of the lower surface of the conductive portion is exposed to an electrochemical mechanical processing (ECMP) environment.

25. A system for electrochemical mechanical processing, comprising:
a polishing pad assembly having a conductive element;
a carrier head, configured to contact the polishing pad assembly, the carrier head comprising:
a base; and
a retaining ring attached to the base, wherein the retaining ring comprises:
a conductive portion having an upper surface and a lower surface, wherein the lower surface is exposed to an electrochemical mechanical processing (ECMP) environment; and
a substrate contacting portion forming at least part of an inner diameter surface, the substrate contacting portion formed of an insulating material; and
a voltage source electrically coupled to the conductive element of the polishing pad assembly.

26. The retaining ring of claim 1, wherein the lower surface of the conductive portion is planar with the lower surface of the substrate contacting portion.

27. The retaining ring of claim 1, wherein the substrate contacting portion is annular and surrounds a void and the substrate contacting portion is between the void and the conductive portion.

28. The method of claim 16, wherein:
forming the annular body includes forming the annular body to have a substrate receiving aperture surrounded by the inner diameter surface; and
securing the conductive portion includes positioning at least part of the annular body between the conductive portion and the substrate receiving aperture.

* * * * *